Feb. 17, 1959 P. M. VAN ALPHEN ET AL 2,874,300
DEVICE FOR X-RAY EXAMINATION
Filed July 12, 1954

INVENTORS
PIETER MARTINUS VAN ALPHEN
JOHANNES VAN DER WAL
JAN JESAYAS CHRISTIAAN HARDENBERG
BY

AGENT

2,874,300
Patented Feb. 17, 1959

2,874,300

DEVICE FOR X-RAY EXAMINATION

Pieter Martinus van Alphen, Johannes van der Wal, and Jan Jesayas Christiaan Hardenberg, Eindhoven, Netherlands, assignors, by mesne assignments, to North American Philips Company, Inc., New York, N. Y., a corporation of Delaware Application July 12, 1954, Serial No. 442,576

Claims priority, application Netherlands July 20, 1953

5 Claims. (Cl. 250—65)

For X-ray fluoroscopy use is sometimes made of an instrument which converts the invisible X-ray image into a luminous image and the latter into an electron image which is focused on a fluorescent screen. The luminous intensity of the fluorescent image obtained by means of such an image intensifier is sufficient or may be rendered suitable for making a photograph of an image on a photographic plate or film by a slight increase in X-ray intensity. The image intensifier is, moreover, particularly suitable for making successive photographs at the rate of cinematography. The film photographs thus obtained have the advantage of having the conventional size, so that compared with the direct photography of X-ray images substantial economy in film material is obtained.

In making single photographs it is desirable to be able to observe visually the image to be photographed till the moment when the photograph is taken. In a device for X-ray image cinematography by means of an image intensifier the screen for converting the X-rays into light has arranged at its side a similar screen which can be constantly observed. Thus not the image surface proper is observed but part of the surroundings, which renders orientation and correct adjustment of the image intensifier more difficult.

The invention relates to a corresponding cinematographic device comprising a photographic camera permitting the visual observation of the fluorescent image to be photographed. According to the invention a preferably flat mirror is provided in the course of the rays from the fluorescent screen of the image intensifier, confined by the optical system of the camera, which mirror permits the operator to observe the reproducing screen via an optical magnifying instrument. This is particularly of importance, if it is desired to photograph a definite moment of the motion of moving members. Thus wastage of film material may be avoided, since it is then no longer necessary to make exposures of the complete motion.

If desired, the mirror may be positioned in a manner such that it can be moved out of the range of luminous rays, when an exposure is to be made so as to prevent the mirror from intercepting part of the light radiated by the reproducing screen in the direction of the optical system.

It is necessary to position the mirror near the reproducing lens, in order to prevent it from being reproduced on the photographic film. It may be arranged in the optical axis of the course of rays and its surface may be minimized in order that a minimum quantity of light is intercepted. A particularly efficient arrangement is obtained, if the mirror is positioned between the two lenses of an optical tandem system at the edge of the course of rays between the two lenses, so that the objective of the observation instrument may be moved close to the mirror and a small mirror surface yet permits of observing the entire reproducing screen.

If a larger mirror can be used, for example in the case of a camera comprising an optical mirror system, the device may also serve as a projection device (epidiascope). To this end use may be made of the same mirror, which must then be pivotable through an angle of 90° about an axis at right angles to the plane in which the optical axis lies for direct observation.

The invention will now be described with reference to the accompanying drawing, in which.

Figures 1, 2:
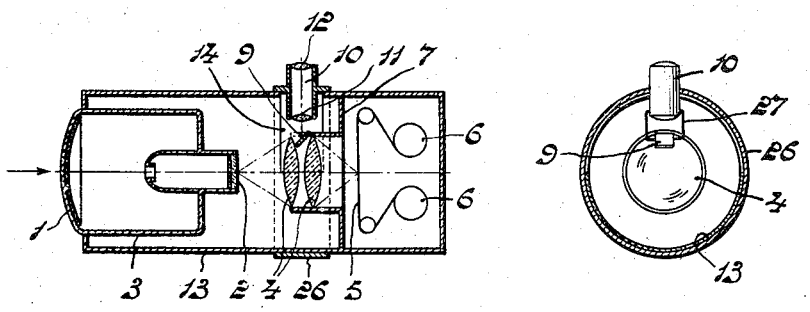
Fig. 1 shows the combination of an image intensifier and an exposure camera, the latter comprising an optical lens system.
Fig. 2 is a sectional view taken at the area of the optical lens system.

The exposure screen 1 collects the X-rays, which are converted into light and subsequently into electron rays, which are focused on the reproducing screen 2. The image intensifier 3, comprising these two screens, may be of conventional construction. The image on the reproducing screen 2 is exposed by means of the cinematographic film camera comprising a tandem lens 4, the film 5 with the driving gear 6 being housed in a light-tight envelope 7. Such a camera comprises, moreover, a device for periodical interruption of the luminous path, but a detailed description may be omitted, since the camera does not differ in principle from known devices.

The course of rays from the fluorescent screen 2 is confined by the lens 4 and between the two lens parts provision is made of a small mirror 9 at an angle of 45°. Only small part of the beam of light is intercepted by the reflecting part of the surface and deflected into the direction of the observation instrument 10. This instrument comprises a lens 11, which projects an image of the reproducing screen 2 in the sight opening 12. The image to be exposed may thus be constantly observed and it is thus possible to restrict the series of exposures to a cycle of motion functions accomplished by the object examined and wanted for the examination. The adjustment of the device may, moreover, be controlled readily in a manner such that the most important part of the image is in the centre of the film.

The space between the image intensifier 3 and the exposure device 7 is enclosed in a light-tight cylinder 13. The wall thereof has an opening 14 through which the observation instrument 10 is introduced.

Figure 3:
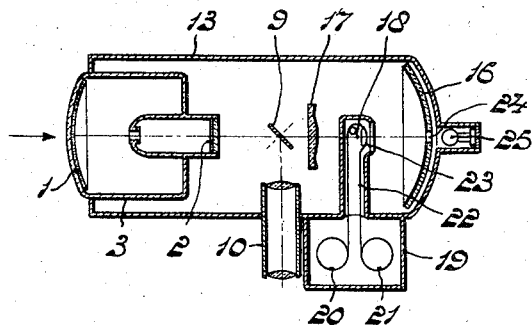
Fig. 3 shows the combination of an image intensifier and a mirror camera.

In Fig. 3 the same reference numerals are used, as far as possible, for the corresponding elements shown in Fig. 1. The image intensifier is combined with a mirror camera in a manner such that their axes coincide. A detailed description of the mirror camera may be omitted, since in principle it is identical with known devices of this kind.

The camera comprises a hollow mirror 16, a correction plate 17 and a film carrier 18. To the common envelope 13 is secured a box 19 containing the two reels 20 and 21 for the film 22. One reel has the exposed film part, the other the part not yet exposed. The camera comprises, moreover, a device to propagate the film each time through a distance equal to the height of the image produced by the mirror 16, the drawing shows no details of this device.

The image of the X-ray image produced on the exposure screen 1, this image appearing reduced on the reproducing screen 2 of the image intensifier 3 and having a many times increased brightness, constitutes the object for the optical mirror system of the camera, in the image plane of which the film 22 is extended by means known per se.

Between the image intensifier and the mirror camera provision is made of the preferably flat mirror 9 which permits the operator to observe the screen 2 through the optical magnifying instrument 10. Owing to the larger opening of the mirror camera the reflecting surface need not be so small as in the lens camera.

For projection the mirror 9 may be pivoted through an angle of 90° about an axis at right angles to the plane of the drawing, the mirror then occupying the position indicated in broken lines. The hollow mirror 16 may have a central opening 24, in front of which the source of light 24 is positioned in order to illuminate the image surface 23 of the mirror camera. In this image surface is provided the plate to be reproduced and the rays of light which are diffused and reflected by this plate are focused by the mirror 16 and partly projected via the mirror 9 onto a screen arranged at the side of the device, the image thus projected being observable on this screen.

The opening 14 for the introduction of the instrument 10 may have the shape of a slot, which may extend on either side of the arrangement shown through for example one-quarter of the circumference of the cylinder 13. The observation instrument may be moved into various positions, if the examination requires it or if the observation of the reproducing screen may thus be facilitated. In order to maintain the light-tight closure, the observation instrument is in this case secured in a ring 26, which embraces the sheath periphery of the cylinder 13 and which covers the slot 14 in the wall. The mirror 9 is secured by straps 27 to the instrument 10 and thus follows the displacements of the observation instrument.

What is claimed is:

1. A device for X-ray examination comprising in combination, an image intensifier having a fluorescent screen for converting an electron-optical image of an X-ray image into a visible image and a cinematographic film-recording device for making a continuous photograph of the visible image, said film-recording device having an optical system for projecting said visible image along a given axis onto a moving film-strip, and means for viewing the visible image including a plane mirror disposed between the moving film-strip and the visible image for reflecting an image corresponding to the projected image on the film-strip, pivot means for rotating said mirror about an axis passing through the mirror and perpendicular to said given axis, and optical means for viewing the image reflected by said plane mirror.

2. The device of claim 1 wherein the film-recording device includes an optical tandem system having two spaced and aligned lenses for projecting the visible image on the film-strip and wherein the mirror is positioned between said lenses.

3. The device of claim 2 wherein said optical view means is rotatable about said given axis.

4. The device of claim 1 wherein the film recording device includes a hollow mirror having an opening for projecting the visible image on the film-strip and wherein the plane mirror intersects the optical axis of the film recording device.

5. The device of claim 4 wherein said optical view means is rotatable about said given axis.

References Cited in the file of this patent

UNITED STATES PATENTS

| | | |
|---|---|---|
| 2,166,440 | Jones | July 18, 1939 |
| 2,337,722 | Konigsberg et al. | Dec. 28, 1943 |
| 2,586,392 | Sheldon | Feb. 19, 1952 |
| 2,645,721 | Williams | July 14, 1953 |